(12) United States Patent  (10) Patent No.: US 7,530,509 B2
Gaughan et al.  (45) Date of Patent: *May 12, 2009

(54) MANURE-GRINDING FERTILIZER SPREADER

(75) Inventors: Ricky L. Gaughan, 3941 Saint Johns Pkwy., Longwood, FL (US) 32771; Dwight Stephen Tabb, Sorrento, FL (US)

(73) Assignee: Ricky L. Gaughan, Longwood, FL (US)

( * ) Notice: Subject to any disclaimer, the term of this patent is extended or adjusted under 35 U.S.C. 154(b) by 301 days.

This patent is subject to a terminal disclaimer.

(21) Appl. No.: 11/487,895

(22) Filed: Jul. 17, 2006

(65) Prior Publication Data

US 2008/0023504 A1 Jan. 31, 2008

(51) Int. Cl.
*A01C 15/00* (2006.01)
*A01C 19/00* (2006.01)

(52) U.S. Cl. ........................ 239/670; 239/657; 222/623

(58) Field of Classification Search ......... 239/650–689; 222/623
See application file for complete search history.

(56) References Cited

U.S. PATENT DOCUMENTS

| 75,601 | A |  | 3/1868 | Tilton |  |
|---|---|---|---|---|---|
| 862,948 | A |  | 8/1907 | De Uribe |  |
| 876,076 | A |  | 1/1908 | Mylor et al. |  |
| 1,835,641 | A |  | 10/1931 | Finfrock |  |
| 2,350,107 | A |  | 5/1944 | Gandrud |  |
| 2,554,637 | A |  | 5/1951 | Rerick |  |
| 2,558,352 | A | * | 6/1951 | Gandrud | ..................... 366/279 |
| 2,680,539 | A |  | 6/1954 | Seltzer |  |
| 4,155,315 | A | * | 5/1979 | Dobbins | ......................... 111/8 |
| 4,234,131 | A | * | 11/1980 | Baker | ......................... 239/685 |
| 5,850,975 | A |  | 12/1998 | Bauer |  |
| 6,321,954 | B1 | * | 11/2001 | Tabb | ......................... 222/623 |

* cited by examiner

*Primary Examiner*—Davis Hwu
(74) *Attorney, Agent, or Firm*—The Livingston Firm; Edward M. Livingston, Esq.; Bryan L. Loeffler, Esq.

(57) ABSTRACT

An improved manure-grinding fertilizer spreader having at least two progressively bladed cylinders 17 at a bottom of a funneled mobile hopper 11 with a grinder base 12 proximate a discharge aperture 13. The mobile funneled hopper is hand-cart sized to be hand-pulled or small-tractor-pulled with at least two progressively bladed cylinders 17 being rotated by detachable engagement of wheels 15 with at least two cutter axles 10 and 56 on which the at least two progressively bladed cylinders 17 are situated axially. An optional agitator 47 may be used in conjunction with the improved manure-grinding fertilizer spreader so as to prevent manure build-up.

41 Claims, 7 Drawing Sheets

MANURE-GRINDING FERTILIZER SPREADER

BACKGROUND OF THE INVENTION

This invention relates to fertilizer spreaders and in particular to an improved fertilizer spreader that grinds, chops and selectively pulverizes horse and other animal fertilizer and straw-like stable bedding for uniform spreading on land.

Numerous fertilizer spreaders are known. None are known, however, to grind, chop and selectively pulverize animal manure in a manner taught by this invention.

The relevant prior art includes the following patents:

| Pat. No. (U.S. unless otherwise stated) | Date | Inventor |
| --- | --- | --- |
| 6,321,954 | Nov. 27, 2001 | Tabb |
| 5,850,975 | Dec. 22, 1998 | Bauer |
| 2,680,539 | Jun. 8, 1954 | Seltzer |
| 2,554,637 | May 29, 1951 | Rerick |
| 2,558,352 | Jun. 26, 1951 | Gandrud |
| 2,350,107 | May 30, 1944 | Gandrud |
| 1,835,641 | Dec. 8, 1931 | Finfrock |
| 876,076 | Jan. 7, 1908 | Mylor, et al. |
| 862,948 | Aug. 13, 1907 | De Uribe |
| 75,601 | Mar. 17, 1868 | Tilton |

SUMMARY OF THE INVENTION

Objects of patentable novelty and utility taught by this invention are to provide a manure-grinding fertilizer spreader which:

grinds, chops and selectively pulverizes animal manure while being spread;

can be made in small sizes for handling and spreading manure of one-to-few horses or other pets conveniently and inexpensively;

can be made in medium sizes for handling and spreading manure of up to a dozen horses or other pets conveniently and inexpensively; and can be made in commercial sizes for spreading manure of large herds of stabled horses, cows, fowl and other animals cost-effectively.

This invention accomplishes these and other objectives with an improved manure-grinding fertilizer spreader having at least two spiral-bladed cylinders at a bottom of a mobile funneled hopper with a grinder base proximate a discharge aperture. In a small, few-animal embodiment, the mobile funneled hopper is hand-cart sized to be hand-pulled or small-tractor-pulled with the spiral-bladed cylinders being rotated by detachable engagement of wheels with at least two axles on which the spiral-bladed cylinders are situated axially. In a powered embodiment for all sizes, the spiral-bladed cylinders are rotated by a motor in close proximity to a blade on the grinder base to cut stable-bedding straw and hard manure for pulverized spreading. In large commercial sizes, the funneled hopper can be at an end of a spreader vehicle from which manure is belt-conveyed to the hopper for grinding and spreading. An optional agitator may be used in conjunction with the improved manure-grinding fertilizer spreader to keep the manure churning within the mobile funneled hopper, thereby preventing building of the manure.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are explained briefly as follows:

DESCRIPTION OF PREFERRED EMBODIMENT

Listed numerically below with reference to the drawings are terms used to describe features of this invention. These terms and numbers assigned to them designate the same features throughout this description.

| | |
| --- | --- |
| 1. | Spiral-bladed cylinder |
| 2. | Spiral blades |
| 3. | Wave-bladed cylinder |
| 4. | Waved blades |
| 5. | Stagger-bladed cylinder |
| 6. | Staggered blades |

-continued

| | |
|---|---|
| 7. | Arcuate-bladed cylinder |
| 8. | Arcuate blades |
| 9. | Dihedral blades |
| 10. | First cutter axle |
| 11. | Mobile hopper |
| 12. | Grinder base |
| 13. | Discharge aperture |
| 14. | Fastener lever |
| 15. | Wheel |
| 16. | Progressive blades |
| 17. | First progressively bladed cylinder |
| 18. | Back wall |
| 19. | Front wall |
| 20. | First side wall |
| 21. | Second side wall |
| 22. | Grinder blade |
| 23. | Tongue |
| 24. | Tractor attachment |
| 25. | Handcart traces |
| 26. | Cross rod |
| 27. | Container bed |
| 28. | Floor |
| 29. | Conveyor belt |
| 30. | Conveyor wheel |
| 31. | Flow-control gate |
| 32. | Conveyor V-belt |
| 33. | First V-belt wheel |
| 34. | Second V-belt wheel |
| 35. | Engine |
| 36. | Cutter V-belt |
| 37. | Cutter-belt wheel |
| 38. | Wheel V-belt |
| 39. | Engine V-belt wheel |
| 40. | Idler wheel |
| 41. | Engine platform |
| 42. | Wheel struts |
| 43. | Pivot fastener |
| 44. | Wheel protrusion |
| 45. | Hub protrusion |
| 46. | Lock cam |
| 47. | Agitator |
| 48. | Cross bar |
| 49. | Agitator wheel |
| 50. | Agitator rod |
| 51. | Dowel pin |
| 52. | Agitator mounting plate |
| 53. | Bolt |
| 54. | Agitator wheel extension |
| 55. | Agitator wheel groove |
| 56. | Second cutter axle |
| 57. | Second progressively bladed cylinder |
| 58. | Handle |

Figure 6:
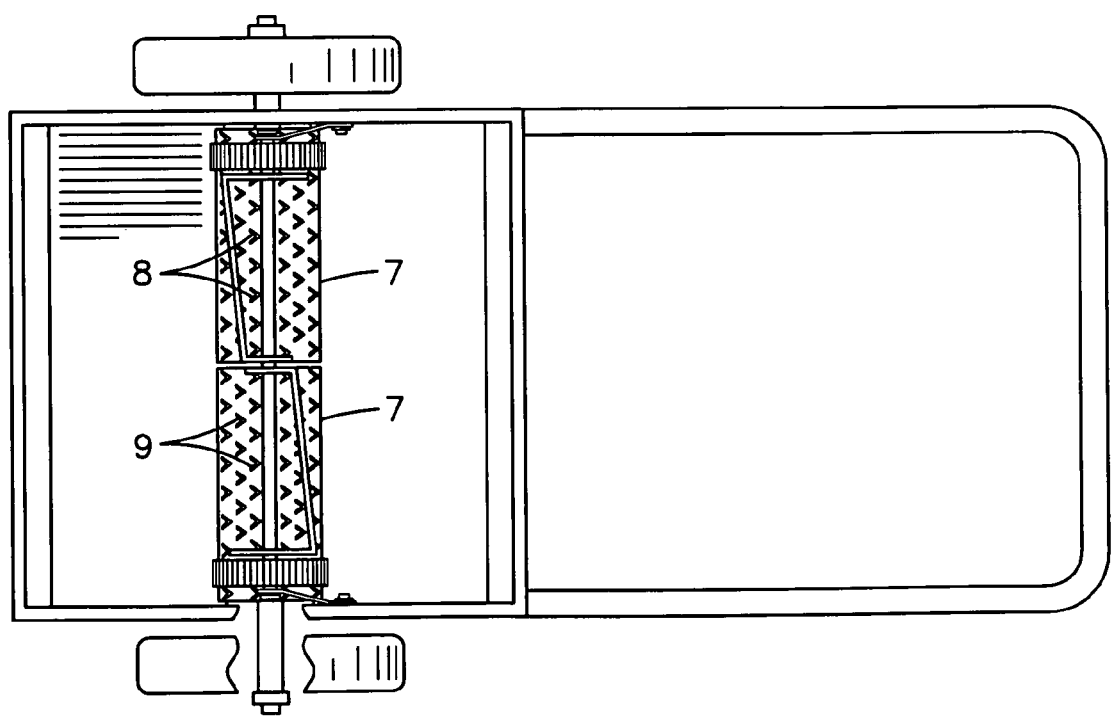
FIG. 6 is a top view of the mobile hopper having arcuate and dihedral blades for the progressively bladed cylinder.
Figure 7:
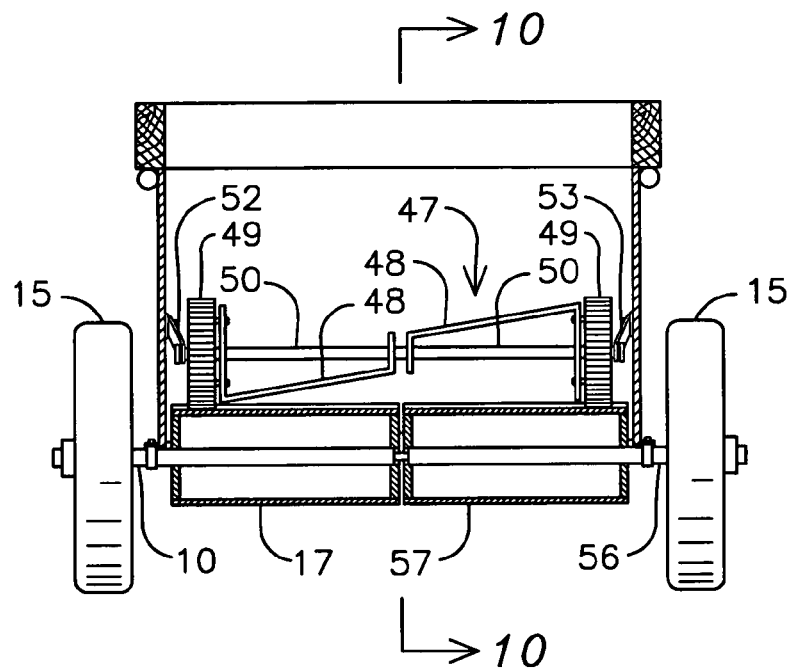
FIG. 7 is a cross-sectional view along line 7-7 of FIG. 1.
Figure 8:
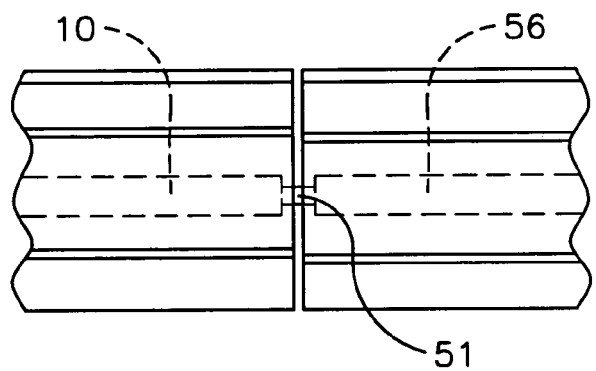
FIG. 8 is a plan view of the progressively bladed cylinders of the present invention.
Figure 9:
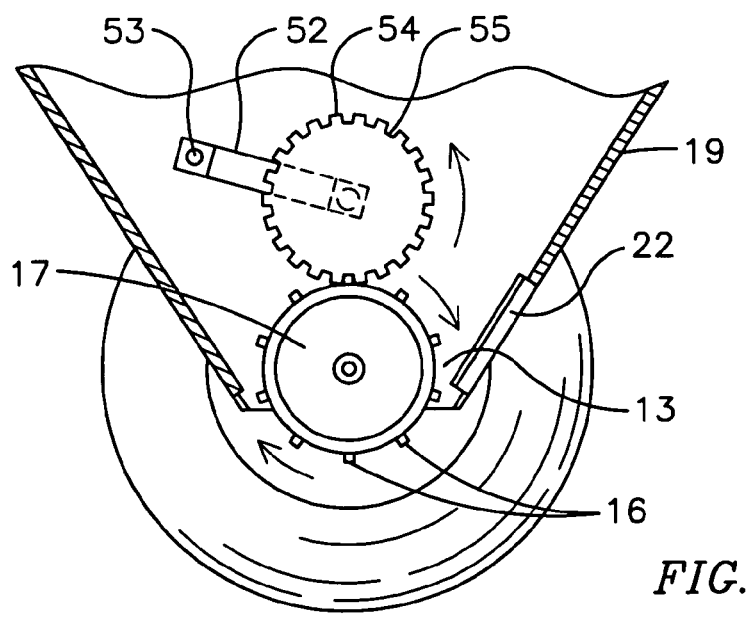
FIG. 9 is a partially cutaway side view of a discharge aperture with an agitator.
Figure 10:
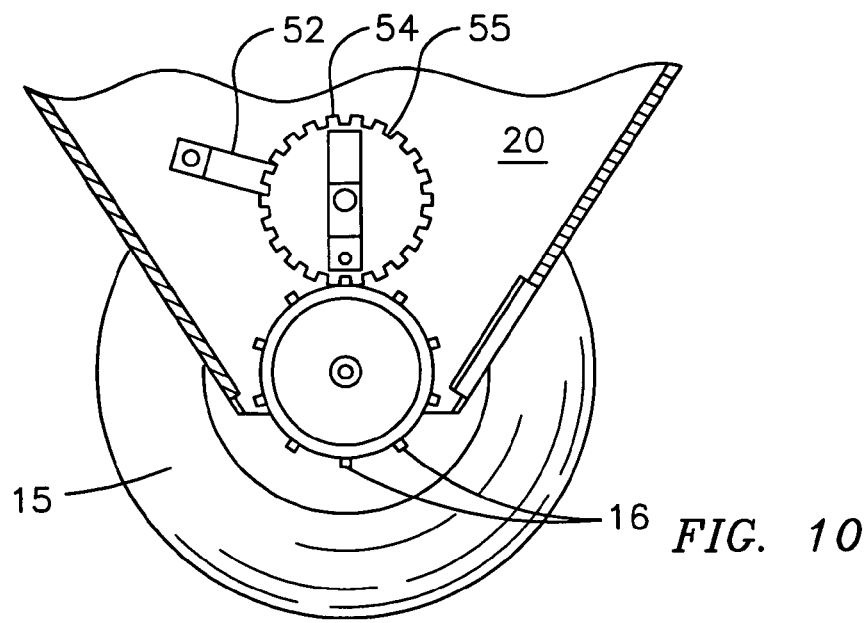
FIG. 10 is a cross-sectional view along line 10-10 of FIG. 7.

Reference is made to FIGS. 1-5, 7-8, 11-12 and 17. At least two progressively bladed cylinders 17 and 57, including at least two spiral-bladed cylinders 1 shown in FIGS. 1 and 3, has a plurality of spiral blades 2 disposed circumferentially on an outside periphery of the spiral-bladed cylinders 1. Also included as progressively bladed cylinders 17 and 57 are at least two wave-bladed cylinder 3 with waved blades 4 shown in FIG. 4, at least two stagger-bladed cylinders 5 with staggered blades 6 shown in FIG. 5, and at least two arcuate-bladed cylinders 7 with arcuate blades 8 and dihedral blades 9 shown in FIG. 6.

Each progressively bladed cylinder 17 and 57 is attached concentrically to a cutter axle 10 and 56 proximate a bottom of a mobile hopper 11 having a grinder base 12 in predetermined proximity to cutting edges of a plurality of the progressive blades 16. For instance, in the improved manure-grinding fertilizer spreader wherein two progressively bladed cylinders 17 and 57 are utilized, a first progressively bladed cylinder 17 is attached concentrically to a first cutter axle 10 and a second progressively bladed cylinder 57 is attached concentrically to a second cutter axle 56. Although two progressively bladed cylinders 17 and 57 are shown, the present invention may also utilize three progressively bladed cylinders, four progressively bladed cylinders and so forth wherein each progressively bladed cylinder is attached concentrically to its own cutter axle. Each cutter axle 10 and 56 is connected to one another via a connecting means, which is preferably a dowel pin 51, that is housed within the first cutter axle 10 and the second cutter axle 56. In this manner, each cutter axle 10 and 56 is independent of the other, meaning the first cutter axle 10 may rotate while the second cutter axle 56 remains stationary.

A discharge aperture 13 in a bottom hopper portion and downward from the grinder base 12 has parallel sides that are oppositely disposed a distance for receiving a predetermined portion of the progressively bladed cylinders 17.

An optional removable agitator 47 may be used in conjunction with the improved manure-grinding fertilizer spreader of the present invention to further assist in the churning and breaking up of manure. The agitator 47 is secured to the side walls 20 and 21 of the mobile hopper 11, preferably via an agitator mounting plate 52 and bolts 53. The agitator 47 preferably includes at least two agitator wheels 49 having predetermined circumferences located on opposing ends of an agitator rod 50. At least two cross bars 48 are attached concentrically to the agitator rod 50. Each cross bar 48 is secured to an agitator wheel 49 so as to rotate when the agitator wheel 49 rotates. When the improved manure-grinding fertilizer spreader of the present invention is in use, the progressively bladed cylinders 17 and 57 rotate when the respective axle 10 and 56 is rotated, that is, when the respective wheel 15 rotates. When the optional agitator 47 is installed in the present invention, the agitator wheels 49 rest upon the progressively bladed cylinders 17 and 57 or are located slightly above the progressively bladed cylinders 17 and 57. When the progressively bladed cylinders 17 and 57 rotate, a portion of the progressive blades 16 wedge themselves into agitator wheel grooves 55, between agitator wheel extensions 54. The more the progressively bladed cylinders 17 and 57 rotate, the more the agitator wheels 49 rotate. Because each cross bar 48 is connected to an agitator wheel 49, when each agitator wheel 49 rotates, the corresponding cross bar 48 also rotates. Therefore, when the improved manure-grinding fertilizer spreader of the present invention is in use, whenever a wheel 15 rotates, the corresponding cross bar 48 located within the mobile hopper 11 also rotates, thereby preventing build-up of the manure within the mobile hopper 11. In addition, the use of the optional agitator 47 with the present invention alleviates the force exerted on the cutter axles 10 and 56 as the larger pieces of manure are broken down prior to breakdown by the progressively bladed cylinders 17 and 57.

Figure 1:
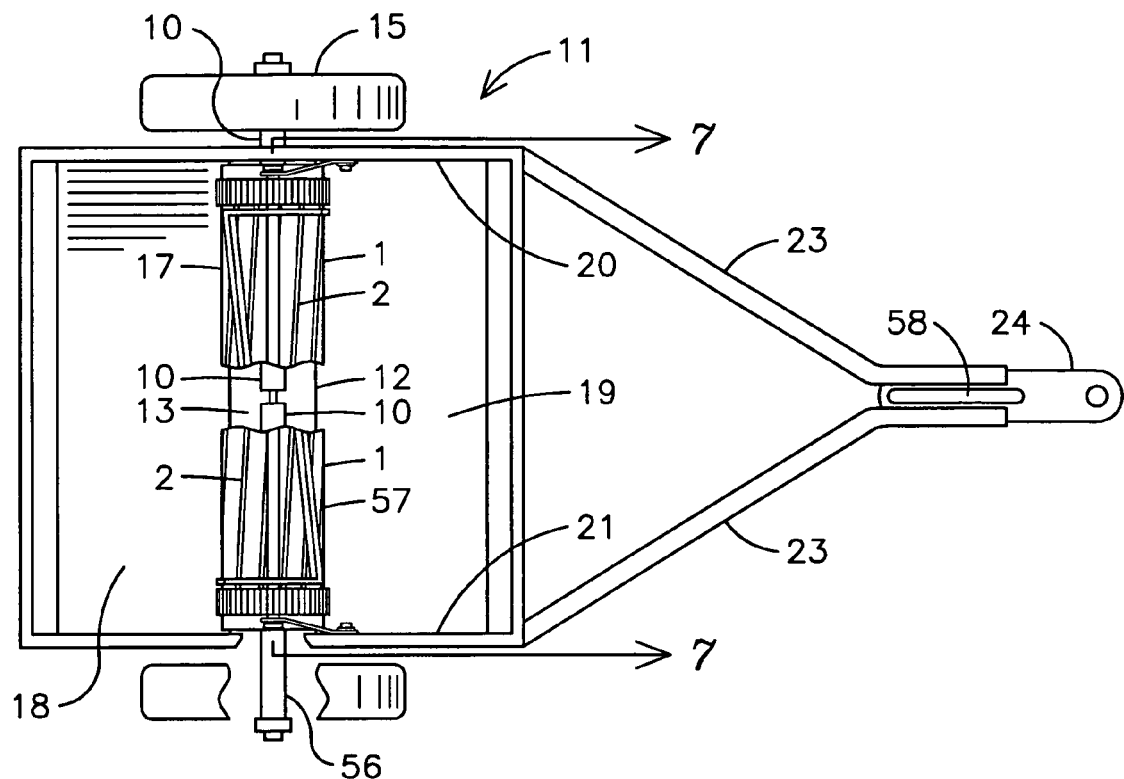
FIG. 1 is a partially cutaway top view of an improved manure-grinding fertilizer spreader having two spiral-bladed cylinders as progressively bladed cylinders and having a tractor attachment as a mobile-power attachment.
Figure 2:
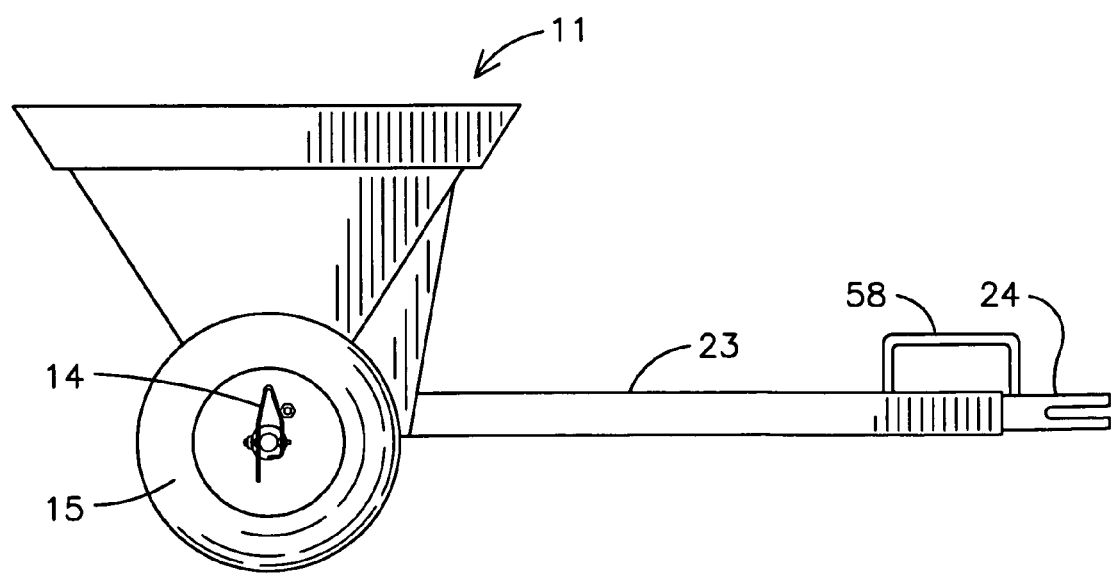
FIG. 2 is a side view of the FIG. 1 illustration.
Figure 3:
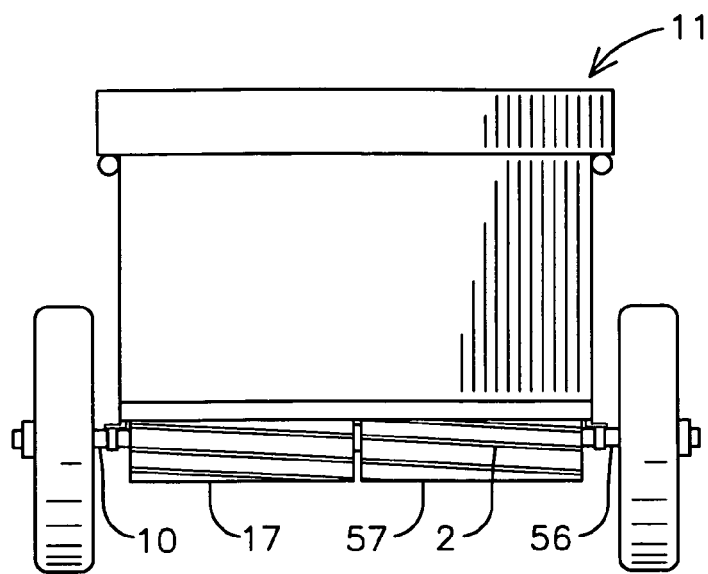
FIG. 3 is a rear view of the FIG. 1 illustration.
Figure 11:
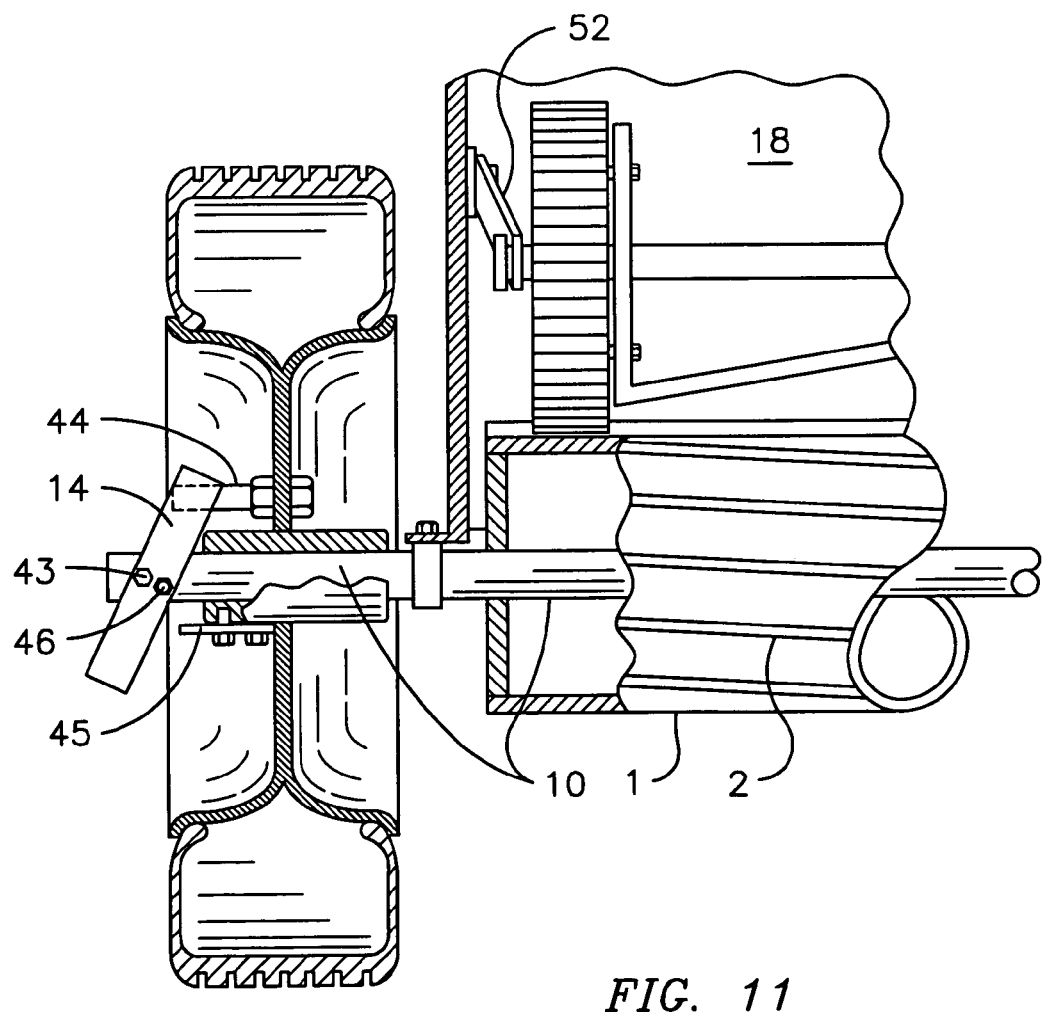
FIG. 11 is a partially cutaway rear view of a releasable connection of a wheel to a cutter axle.
Figure 12:
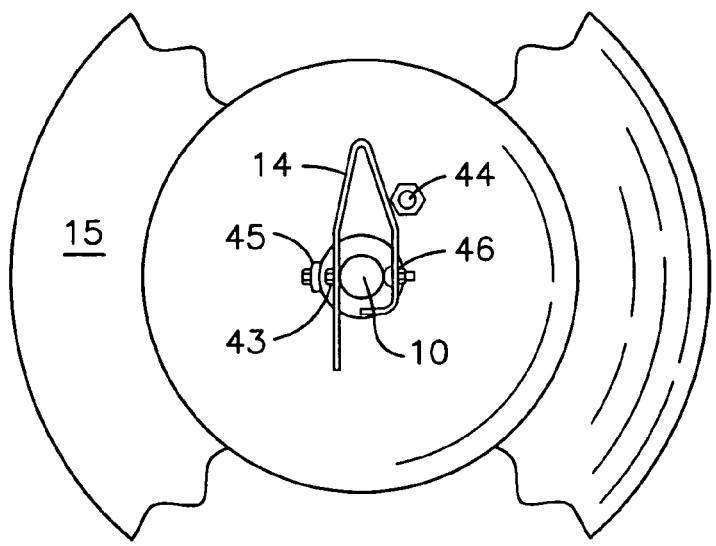
FIG. 12 is a partially cutaway end view of the FIG. 11 releasable connection of the wheel to the cutter axle.

A rotational power source in rotational communication with the cutter axles 10 and 56 for rotation of the progressively bladed cylinders 17 and 57 proximate the bottom of the mobile hopper 11 includes a rotational connection that is a fastener lever 14, shown in FIGS. 2 and 11-12, to connect wheels 15 of the mobile hopper 11 to the cutter axles 10 and 56 by rotation of the wheels 15 from movement of the mobile hopper 11. Because the cutter axles 10 and 56 are independent of one another, the turning radius of the improved manure grinding fertilizer spreader is minimal as a first wheel 15 may rotate while a second wheel 15 remains static. The fastener lever 14 is attached pivotally to the axles 10 and 56 with a pivot fastener 43 for being pivoted to contact with a wheel protrusion 44 or a hub protrusion 45 for transmitting rotation of the wheel 15 to the cutter axles 10 and 56. A lock cam 46 can be provided on a leaf-spring V-leg of the fastener lever 14 for hand-operable spring retainment of the fastener lever 14 in a pivoted position of contact with the wheel protrusion 44 or the hub protrusion 45 over the cutter axles 10 and 56 or in a pivoted position of non-contact with the wheel protrusion 44 or the hub protrusion 45 under the cutter axles 10 and 56 selectively.

As shown in FIGS. 4-6 and 9-10, progressive blades 16 which are representative of the spiral blades 2, the waved blades 4, the staggered blades 6, the arcuate blades 8 and the dihedral blades 9, have a predetermined closeness circumferentially on the progressively bladed cylinders 17 and 57. The progressively bladed cylinders 17 and 57 are representative of the spiral-bladed cylinders 1, the wave-bladed cylinders 3, the stagger-bladed cylinders 5 and the arcuate-bladed cylinders 7. The progressive blades 16 also have predetermined heights radially outward from the progressively bladed cylinders 17 and 57 for predetermined fineness of grinding of material intermediate the grinder base 12 and top edges of variants of the progressive blades 16.

The discharge apertures 13 are rectangular intermediate a back wall 18, a front wall 19, a first side wall 20 and a second side wall 21. A bottom portion of the front wall 19 can be the grinder base 12 and optionally can contain a grinder blade 22. Use of the grinder blade 22 that is preferably replaceable, position-adjustable and capable of being reconditioned allows lighter and less expensive construction for most of the mobile hopper 11. The grinder blade 22 also allows use of engine power for rotation of the cutter axles 10 and 56 to cut stable-bedding straw and other tough items, including hard-dried manure.

Figure 14:
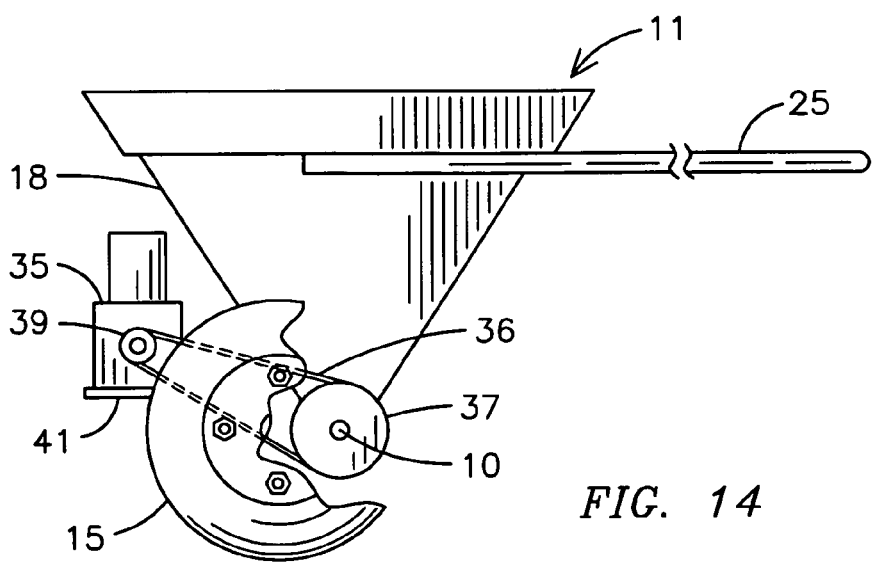
FIG. 14 is a partially cutaway side view of the FIG. 12 illustration.

The discharge aperture 13 can be structured for grinding with the grinder base 12 and an optional grinder blade 22 below a major circumferential portion of the progressively bladed cylinders 17 and 57 or variants thereof as shown in FIG. 14. Optionally, the grinder base 12 and the optional grinder blade 22 can be above the major circumferential portion of the progressively bladed cylinders 17 and 57 or variants thereof.

Figure 4:
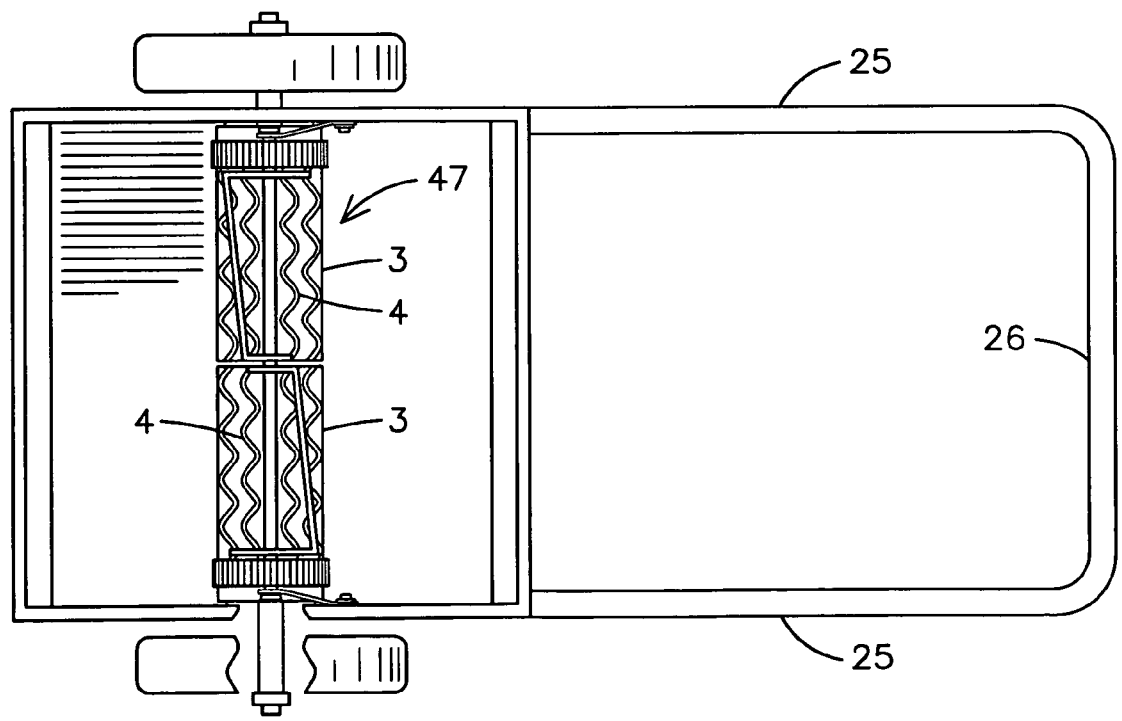
FIG. 4 is a partially cutaway top view of an improved manure-grinding fertilizer spreader having two wave blades as progressively bladed cylinders and having handcart traces as a mobile-power attachment.
Figure 5:
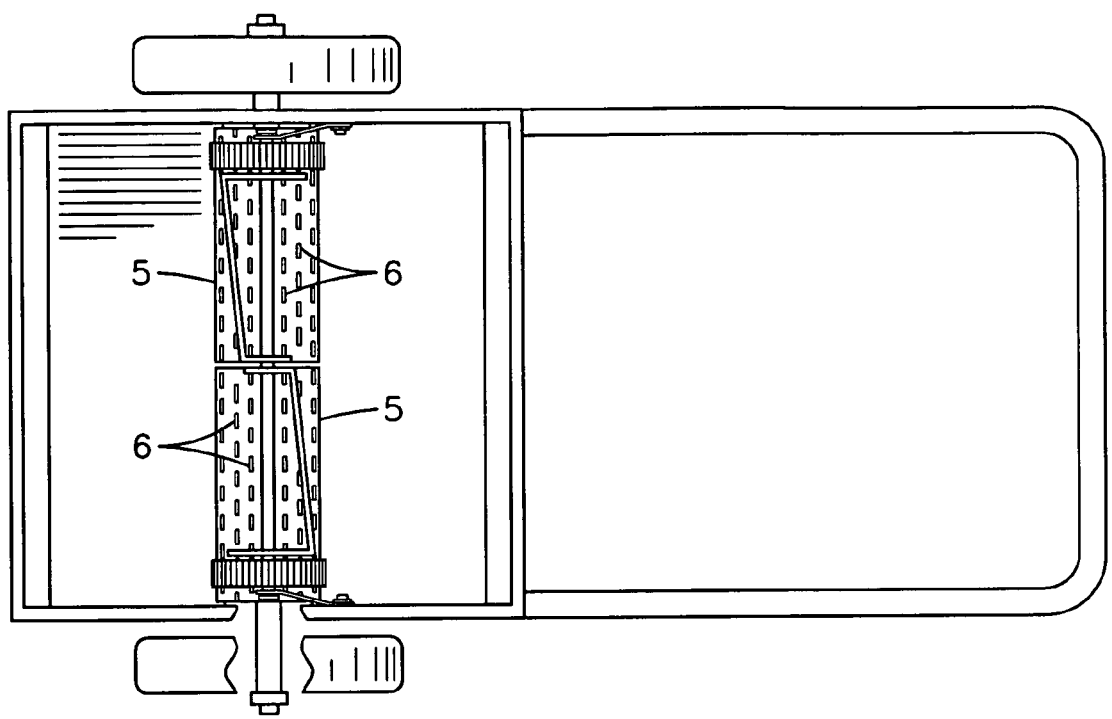
FIG. 5 is a top view of the mobile hopper having staggered blades for the progressively bladed cylinder.

As shown in FIGS. 1-3 and 15-17, the mobile-power attachment can include a tongue 23 with a tractor attachment 24 on the mobile hopper 11. Optionally as shown in FIG. 4 for lighter embodiments, the mobile-power attachment can include handcart traces 25 spaced apart to receive an individual between them and have a front cross rod 26.

Optional to the fastener lever 14 for rotational fastening of the wheels 15 to the cutter axles 10 and 56, the rotational power source can include geared rotational communication with either the spiral-bladed cylinders 1, the wave-bladed cylinders 3, the stagger-bladed cylinders 5, the arcuate-bladed cylinders 7 as variants of the progressively bladed cylinders 17 and 57. Geared rotational communication can include hard gears, select keys in combination with select keyways, or preferably for most uses, a belt gear as shown in FIGS. 15-17.

Figure 15:
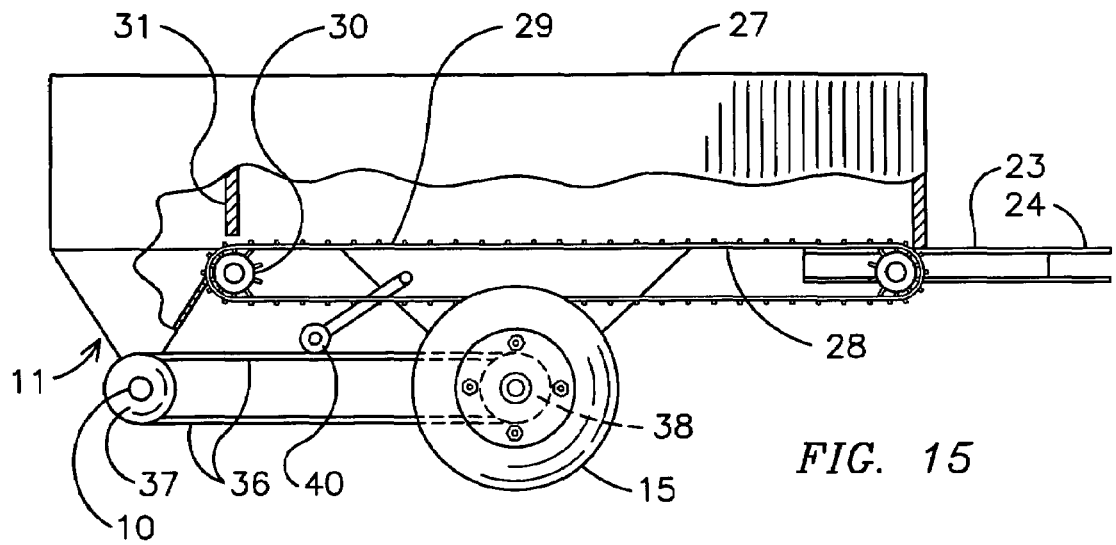
FIG. 15 is a partially cutaway side view of an improved manure-grinding fertilizer spreader having a mobile hopper proximate an aft end of a container bed and having belt-drive gearing as rotational gearing and also having a conveyor belt on the container bed.
Figure 16:
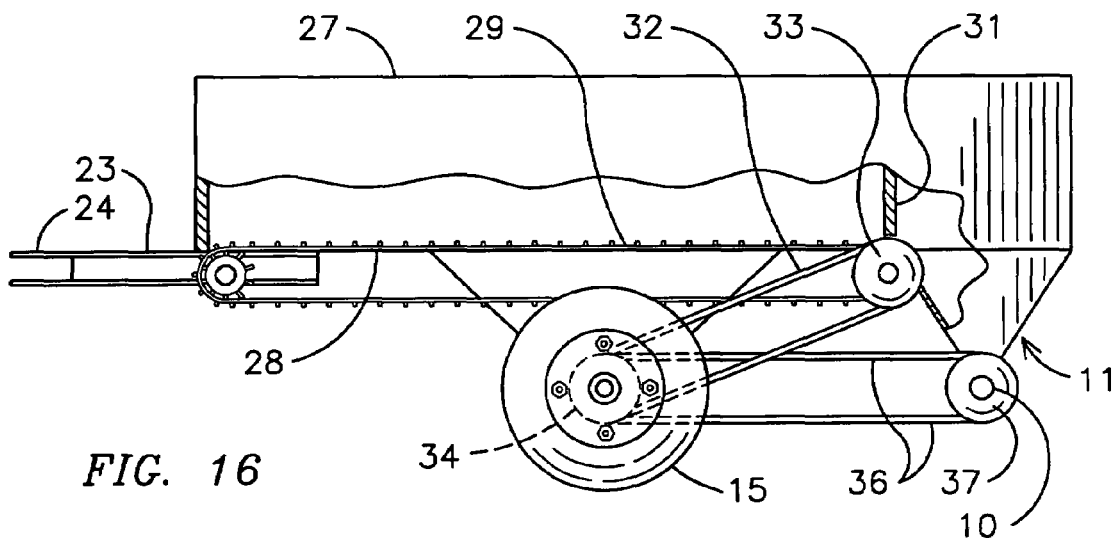
FIG. 16 is a partially cutaway side view that is opposite from the side shown in FIG. 15.
Figure 17:
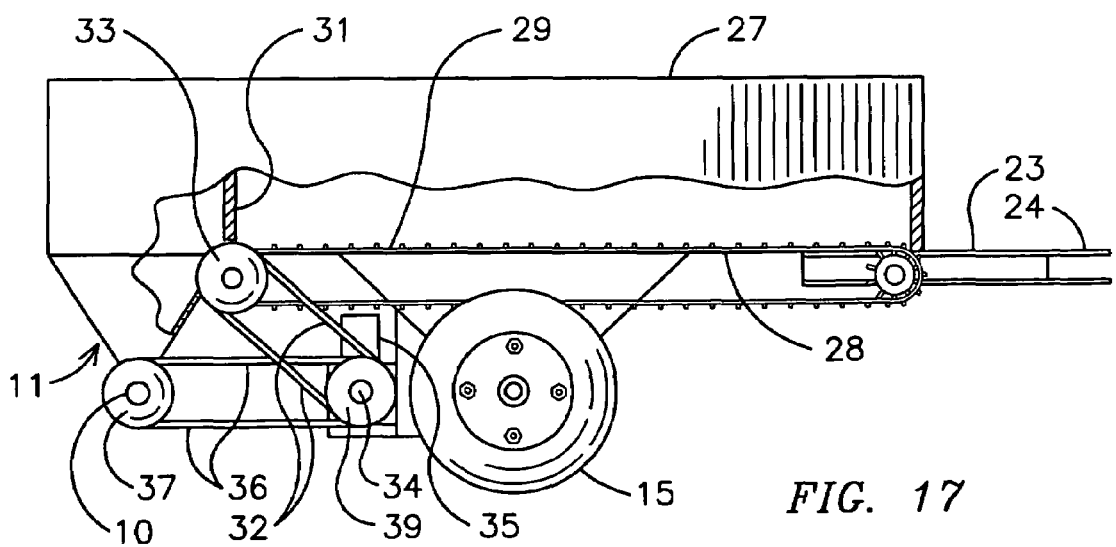
FIG. 17 is a partially cutaway side view of an improved manure-grinding fertilizer spreader having the mobile hopper proximate the aft end of the container bed and having an engine as a conveyor-power source and as the rotational-power source.

In FIGS. 15-17, the mobile hopper 11 includes a container bed 27 having the vehicle wheels 15 oppositely disposed at approximately a linear center of the container bed 27. A top of the mobile hopper 11 is approximately flush with a floor 28 of the container bed 27. A conveyor belt 29 is in communication with a conveyor wheel 30 proximate the top of the mobile hopper 11 to convey manure rearwardly to the mobile hopper 11. A flow-control gate 31 has a bottom edge situated predeterminedly above the conveyor belt 29 to allow selected flow of contents of the container bed 27 into the mobile hopper 11 from rearward travel of the conveyor belt 29.

As shown in FIGS. 15-16, a conveyor-power source in rotational communication with the conveyor wheel 30 can include a conveyor V-belt 32 with a first V-belt wheel 33 on the conveyor wheel 30 and a second V-belt wheel 34 on the vehicle wheel 15. Known belt-grasping and belt-releasing devices that include idle wheels can be employed for engagement and disengagement of the conveyor V-belt 32.

As shown in FIGS. 15 and 17, the conveyor V-belt 32 can be intermediate the first V-belt wheel 33 on the conveyor wheel 30 and the second V-belt wheel 34 on an engine 35 that is attached to the container bed 27.

The mobile-attachment for the container-bed 27 embodiments can include the tongue 23 and the tractor attachment 24 as a hitch as modified appropriately for larger sizes than for the handcart and smaller sizes described in relation to remaining figures.

The rotational-power source for the cutter axles 10 and 56 in container-bed 27 embodiments described in relation to FIGS. 15-17 can be either the wheels 15 or the engine 35. For the wheels 15, as shown from opposite sides in FIGS. 15-16, a cutter V-belt 36 is in communication intermediate a cutter-belt wheel 37 and a wheel V-belt 38. For the engine 35, the cutter V-belt 36 is in communication intermediate the cutter-belt wheel 37 and an engine V-belt wheel 39. For the second V-belt wheel 34 and the wheel V-belt 38, separate belt grooves are assumed.

Known belt-engagement and belt-disengagement mechanisms that include a controllable idler wheel 40 shown in FIG. 15 are assumed for engaging and disengaging the conveyor V-belt 32 and the cutter V-belt 36.

Figure 13:
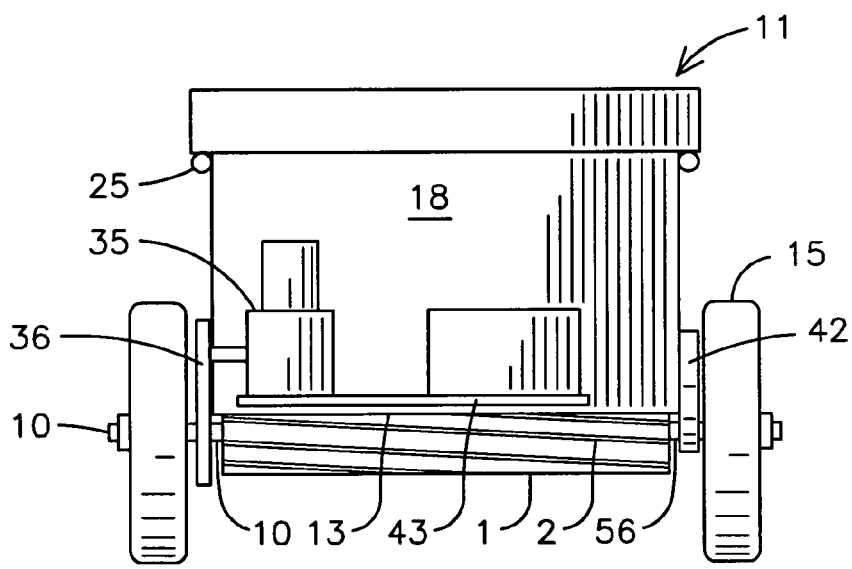
FIG. 13 is a rear view of an engine as a rotational-power source on the mobile hopper.

In FIGS. 12-13, the engine 35, including a fuel tank and accessories, is situated on an engine platform 41 on the back wall 18 for conveyance of power with the cutter V-belt 36 intermediate the engine V-belt wheel 39 and the cutter-belt wheel 37 for rotation of the cutter axle 10. For this light embodiment with an engine for grinding and spreading manure, it is preferable that the wheels 15 be situated aft of the cutter axles 10 and 56 for even distribution of weight of the engine 35 and the mobile hopper 11 on the wheels 15. This can be done with wheel struts 42 shown in FIG. 13.

A new and useful improved manure-grinding fertilizer spreader having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. An improved manure-grinding fertilizer spreader comprising:

at least two progressively bladed cylinders proximate a bottom of a mobile hopper having a grinder base in predetermined proximity to cutting edges of a plurality of progressive blades disposed circumferentially on an outside perimeter of the progressively bladed cylinders;

at least two cutter axles to which the progressively bladed cylinders are attached concentrically;

the at least two cutter axles are connected to one another via a connecting means;

a discharge aperture in a bottom hopper portion that is downward from the grinder base;

the discharge aperture having parallel sides that are oppositely disposed a distance for receiving a predetermined portion of the at least two progressively bladed cylinders;

a rotational-power source in rotational communication with the at least two cutter axles for rotation of the at least two progressively bladed cylinders proximate the bottom of the mobile hopper; and a mobile-power attachment on the mobile hopper.

2. The improved manure-grinding fertilizer spreader of claim 1 wherein:

the connecting means is a dowel pin.

3. The improved manure-grinding fertilizer spreader of claim 1 further comprising:

an agitator secured within said mobile hopper.

4. The improved manure-grinding fertilizer spreader of claim 3 wherein:

said agitator has at least two wheels;

said at least two wheels each having a predetermined circumference;

said at least two wheels each have a plurality of extensions and a plurality of grooves located on said each predetermined circumference;

said at least two wheels are connected to one another via a rod; and at least one cross bar is attached concentrically to said rod.

5. The improved manure-grinding fertilizer spreader of claim 1 wherein:

the progressive blades have a predetermined closeness circumferentially on the at least two progressively bladed cylinders for predetermined shortness of grinding of material intermediate the grinder base and top edges of the progressive blades; and the progressive blades have predetermined heights radially outward from the at least two progressively bladed cylinders for predetermined fineness of grinding of material intermediate the grinder base and the top edges of the at least two progressive blades.

6. The improved manure-grinding fertilizer spreader of claim 5 further comprising:

an agitator secured within said mobile hopper;

said agitator has at least two wheels;

said at least two wheels each having a predetermined circumference;

said at least two wheels each have a plurality of extensions and a plurality of grooves located on said each predetermined circumference wherein said plurality of grooves accepts a portion of said predetermined height of said progressive blades;

said at least two wheels are connected to one another via a rod; and at least one cross bar is attached concentrically to said rod.

7. An improved manure-grinding fertilizer spreader comprising:

at least two spiral-bladed cylinders proximate a bottom of a mobile hopper having a grinder base in predetermined proximity to cutting edges of a plurality of spiral blades disposed circumferentially on an outside perimeter of the at least two spiral-bladed cylinders;

at least two cutter axles to which the at least two spiral-bladed cylinders are attached concentrically;

the at least two cutter axles are connected via a connecting means;

a discharge aperture in a bottom hopper portion that is downward from the grinder base;

the discharge aperture having parallel sides that are oppositely disposed a distance for receiving a predetermined portion of the at least two spiral-bladed cylinders;

a rotational-power source in rotational communication with the at least two cutter axles for rotation of the at least two spiral-bladed cylinders; and a mobile-power attachment on the mobile hopper.

8. The improved manure-grinding fertilizer spreader of claim 7 wherein:

the connecting means is a dowel pin.

9. The improved manure-grinding fertilizer spreader of claim 7 further comprising:

an agitator secured within said mobile hopper.

10. The improved manure-grinding fertilizer spreader of claim 9 wherein:

said agitator has at least two wheels;

said at least two wheels each having a predetermined circumference;

said at least two wheels each have a plurality of extensions and a plurality of grooves located on said each predetermined circumference;

said at least two wheels are connected to one another via a rod; and at least one cross bar is attached concentrically to said rod.

11. The improved manure-grinding fertilizer spreader of claim 7 wherein:

the rotational-power source is a rotational connection intermediate the at least two cutter axles and wheels with which the mobile hopper is mobile.

12. The improved manure-grinding fertilizer spreader of claim 11 wherein:

the wheels are rotational on the at least two cutter axles;

the rotational connection includes a fastener lever that is pivotal selectively on the at least two cutter axles to contact a wheel protrusion for transmitting rotation of the wheels to the at least two cutter axles for rotation of the at least two cutter axles by rotation of the wheels from movement of the mobile hopper; and a lock cam on a leaf-spring V-leg of the fastener lever to spring-cam-retain the fastener lever in a selected pivotal position of contact or non-contact with a protrusion on the wheel.

13. The improved manure-grinding fertilizer spreader of claim 7 wherein:

the rotational-power source is an engine on the mobile hopper; and the engine has a rotational shaft in predetermined rotational communication with the at least two cutter axles.

14. The improved manure-grinding fertilizer spreader of claim 13 and further comprising:

a grinder blade on the grinder base;

the grinder blade is in predetermined proximity to rotational travel of the at least two spiral blades; and the at least two spiral blades have predetermined heights radially outward from the at least two spiral-bladed cylinders for predetermined fineness of grinding of manure and straw-like material passing intermediate the spiral blades and the grinder blade.

15. The improved manure-grinding fertilizer spreader of claim 7 wherein:

the grinder base is in predetermined proximity to the spiral blades; and the spiral blades have predetermined heights radially outward from the at least two spiral-bladed cylinders for predetermined fineness of grinding of manure passing intermediate the spiral blades and the grinder base.

16. The improved manure-grinding fertilizer spreader of claim 15 further comprising:

an agitator secured within said mobile hopper;

said agitator has at least two wheels;

said at least two wheels each having a predetermined circumference;

said at least two wheels each have a plurality of extensions and a plurality of grooves located on said each predetermined circumference wherein said plurality of grooves accepts a portion of said predetermined height of said progressive spiral blades;

said at least two wheels are connected to one another via a rod; and at least one cross bar is attached concentrically to said rod.

17. The improved manure-grinding fertilizer spreader of claim 7 wherein:

the mobile-power attachment to the mobile hopper is a tongue with a tractor attachment.

18. The improved manure-grinding fertilizer spreader of claim 7 wherein:

the mobile-power attachment to the mobile hopper is a pair of handcart traces spaced apart to receive an individual between them and having a front cross rod.

19. The improved manure-grinding fertilizer spreader of claim 7 wherein:

the mobile hopper includes a container bed having oppositely disposed vehicle wheels at proximately a linear center of the container bed;

a top of the mobile hopper is approximately flush with a floor of the container bed;

a conveyor belt is in communication with a conveyor wheel proximate the top of the mobile hopper to convey manure rearwardly to the mobile hopper;

a flow-control gate has a bottom edge situated pre-determinedly above the conveyor belt to allow selected flow of contents of the container bed into the mobile hopper from rearward travel of the conveyor belt;

a conveyor-power source in rotational communication with the conveyor wheel; and container-bed side walls to prevent contents of the container bed from falling off of the container bed.

20. The improved manure-grinding fertilizer spreader of claim 19 wherein:

the mobile-power attachment is a predetermined hitch for hitching the container bed to a predetermined class of vehicles.

21. The improved manure-grinding fertilizer spreader of claim 20 wherein:

the connecting means is a dowel pin.

22. The improved manure-grinding fertilizer spreader of claim 20 further comprising:

an agitator secured within said mobile hopper.

23. The improved manure-grinding fertilizer spreader of claim 22 wherein:

said agitator has at least two wheels;

said at least two wheels each having a predetermined circumference;

said at least two wheels each have a plurality of extensions and a plurality of grooves located on said each predetermined circumference;

said at least two wheels are connected to one another via a rod; and at least one cross bar is attached concentrically to said rod.

24. The improved manure-grinding fertilizer spreader of claim 19 wherein:

the conveyor-power source is a predetermined engine having predetermined conveyor-rotation gearing in rotational communication with the conveyor wheel.

25. The improved manure-grinding fertilizer spreader of claim 19 wherein:

the conveyor-power source is predetermined rotational gearing intermediate at least one of the vehicle wheels and the conveyor wheel.

26. The improved manure-grinding fertilizer spreader of claim 25 wherein:

the predetermined rotational gearing is a V-belt with a first V-belt wheel on the conveyor wheel and a second V-belt wheel on the vehicle wheel.

27. The improved manure-grinding fertilizer spreader of claim 19 wherein:

the rotational-power source is an engine having predetermined rotational gearing in rotational communication with the at least two cutter axles.

28. The improved manure-grinding fertilizer spreader of claim 19 wherein:

the rotational-power source is predetermined rotational gearing intermediate at least one of the vehicle wheels and the at least two cutter axles.

29. The improved manure-grinding fertilizer spreader of claim 28 wherein:

the predetermined rotational gearing is a V-belt with a first V-belt wheel on the at least two cutter axle and a second V-belt wheel on the vehicle wheel.

30. The improved manure-grinding fertilizer spreader of claim 7 wherein:

the spiral blades have a predetermined closeness circumferentially on the at least two spiral-bladed cylinders for predetermined shortness and fineness of grinding of material intermediate the grinder base and top edges of the spiral blades.

31. An improved manure-grinding fertilizer spreader comprising:

at least two stagger-bladed cylinders proximate a bottom of a mobile hopper having a grinder base in predetermined proximity to cutting edges of a plurality of staggered blades disposed circumferentially on an outside perimeter of the at least two stagger-bladed cylinders;

at least two cutter axle to which the at least two stagger-bladed cylinders are attached concentrically;

the at least two cutter axles are connected to one another via a connecting means;

a discharge aperture in a bottom hopper portion that is downward from the grinder base;

the discharge aperture having parallel sides that are oppositely disposed a distance for receiving a predetermined portion of the at least two stagger-bladed cylinders;

a rotational-power source in rotational communication with the at least two cutter axles for rotation of the at least two stagger-bladed cylinders; and a mobile-power attachment on the mobile hopper.

32. The improved manure-grinding fertilizer spreader of claim 31 wherein:

the staggered blades have a predetermined closeness circumferentially on the at least two spiral-bladed cylinders for predetermined shortness of grinding of material intermediate the grinder base and top edges of the staggered blades; and the staggered blades have predetermined heights radially outward from the at least two stagger-bladed cylinders for predetermined fineness of grinding of material intermediate the grinder base and the top edges of the staggered blades.

33. The improved manure-grinding fertilizer spreader of claim 32 further comprising:

an agitator secured within said mobile hopper;

said agitator has at least two wheels;

said at least two wheels each having a predetermined circumference;

said at least two wheels each have a plurality of extensions and a plurality of grooves located on said each predetermined circumference wherein said plurality of grooves accepts a portion of said predetermined height of said staggered blades;

said at least two wheels are connected to one another via a rod; and at least one cross bar is attached concentrically to said rod.

34. The improved manure-grinding fertilizer spreader of claim 32 wherein:

the staggered blades are arcuate with a predetermined cutting edge.

35. The improved manure-grinding fertilizer spreader of claim 31 wherein:

the staggered blades are arcuate with a predetermined cutting edge.

36. An improved manure-grinding fertilizer spreader comprising:

at least two wave-bladed cylinders proximate a bottom of a mobile hopper having a grinder base in predetermined proximity to cutting edges of a plurality of waved blades disposed circumferentially on an outside perimeter of the at least two wave-bladed cylinders;

at least two cutter axles to which the at least two wave-bladed cylinders are attached concentrically;

the at least two cutter axles are connected to one another via a connecting means;

a discharge aperture in a bottom hopper portion that is downward from the grinder base;

the discharge aperture having parallel sides that are oppositely disposed a distance for receiving a predetermined portion of the at least two wave-bladed cylinders;

a rotational-power source in rotational communication with the at least two cutter axles for rotation of the at least two wave-bladed cylinders; and a mobile-power attachment on the mobile hopper.

37. The improved manure-grinding fertilizer spreader of claim 36 wherein:

the connecting means is a dowel pin.

38. The improved manure-grinding fertilizer spreader of claim 36 further comprising:

an agitator secured within said mobile hopper.

39. The improved manure-grinding fertilizer spreader of claim 38 wherein:

said agitator has at least two wheels;

said at least two wheels each having a predetermined circumference;

said at least two wheels each have a plurality of extensions and a plurality of grooves located on said each predetermined circumference;

said at least two wheels are connected to one another via a rod; and at least one cross bar is attached concentrically to said rod.

40. The improved manure-grinding fertilizer spreader of claim 36 wherein:

the waved blades have a predetermined closeness circumferentially on the at least two spiral-bladed cylinders for predetermined shortness of grinding of material intermediate the grinder base and top edges of the waved blades; and the waved blades have predetermined heights radially outward from the at least two wave-bladed cylinders for predetermined fineness of grinding of material intermediate the grinder base and the top edges of the waved blades.

41. The improved manure-grinding fertilizer spreader of claim 40 further comprising:

an agitator secured within said mobile hopper;

said agitator has at least two wheels;

said at least two wheels each having a predetermined circumference;

said at least two wheels each have a plurality of extensions and a plurality of grooves located on said each predetermined circumference wherein said plurality of grooves accepts a portion of said predetermined height of said progressive blades;

said at least two wheels are connected to one another via a rod; and at least one cross bar is attached concentrically to said rod.

* * * * *